July 22, 1941.  W. BAUMGÄRTNER  2,249,929
ROLL FILM CAMERA
Filed April 20, 1938

Inventor:
Wilhelm Baumgärtner
by Franz Reinhold
Attorney

Patented July 22, 1941

2,249,929

UNITED STATES PATENT OFFICE 2,249,929

ROLL FILM CAMERA

Wilhelm Baumgärtner, Brunswick, Germany, assignor, by mesne assignments, to Sherka Chemical Co. Inc., Bloomfield, N. J., a corporation Application April 20, 1938, Serial No. 203,081
In Germany April 21, 1937

3 Claims. (Cl. 95—32)

My invention relates to improvements in roll film cameras, and more particularly in the film guiding means. The object of the improvements is to construct the film guiding means so that the film is exactly positioned in the focal plane. As is known, the roll film has the tendency to be unwound in curved form and so that the portion of greatest curvature is located at the middle of the said focal plane. For holding the film as far as possible in plane position the film is supported at its rear on a backing plate which is pressed on the film by spring action. The strength of the spring should not be too high, because thereby feeding of the film would be interfered with, and the film would be subjected to scratching. Further, when the spring action is too great, the film delivering and winding spools are frequently brought out of parallel position.

The object of the improvements is to provide film guiding means in which the film is held in plane position, and in which objectionable action on the film and the spools by spring pressure is avoided, and with these objects in view my invention consists in providing a stationary film backing plate and yieldingly mounted guide rolls for the film tending to hold the film in contact with the said plate. Further, braking means are provided in connection with the film delivering spool by means of which the film is held under tension when it is being wound on the film winding spool, the said braking means being constructed so that they act on the flanges of the spool and so that the braking action remains constant. Further, the said braking means are constructed so that they get into operative position only after the loaded film spool has been placed into the camera, and the film or the film wrapper has been attached to the film winding spool. Thus, the film spool may be readily placed into the camera, and the backing paper may be readily attached to the film winding spool.

Figure 1:
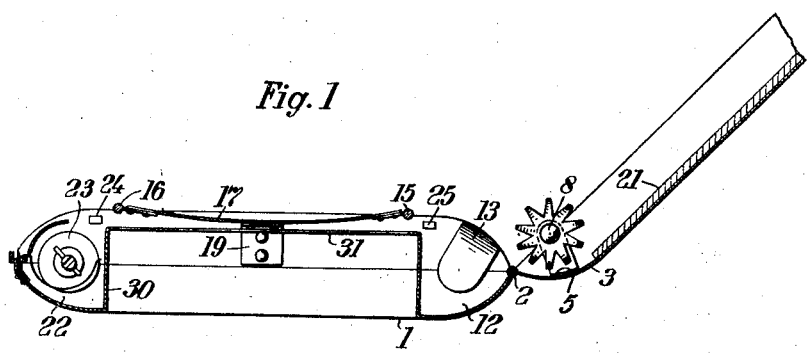
Figure 2:
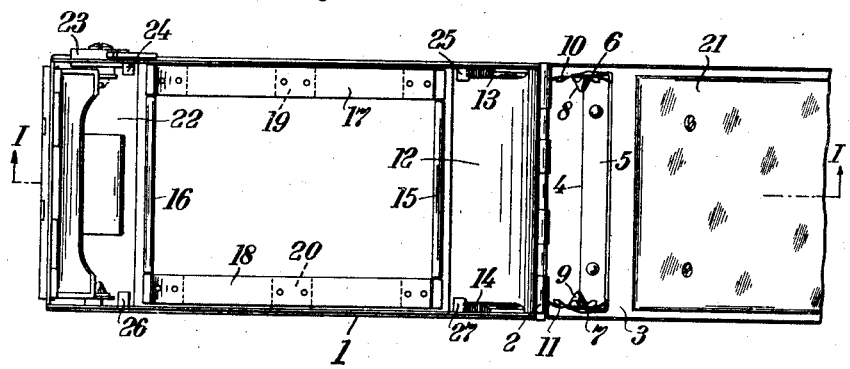
Figure 3:
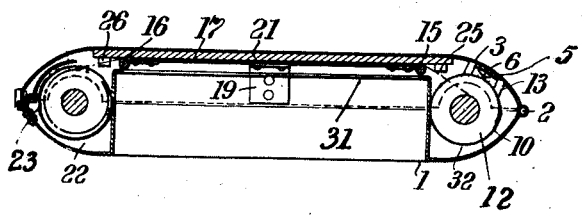

For the purpose of explaining the invention an example embodying the same has been shown in the accompanying drawing, in which the same reference characters have been used in all the views to indicate corresponding parts. In said drawing, Fig. 1 is a sectional elevation taken on the line I—I of Fig. 2 and showing the body of the camera open, Fig. 2 is a top plan-view of Fig. 1, Fig. 3 is a sectional elevation similar to the one illustrated in Fig. 1 and showing the camera in closed position.

In the example shown in the drawing, the camera comprises a body 1 which has a lid 3 hinged thereto at 2. The casing 1 is formed with an inwardly directed portion 30 having an aperture 31 for the passage of the light rays therethrough. Between the portion 30 and the end parts of the casing 1 chambers 12 and 22 are provided, the chamber 12 being adapted to have the film delivering spool 32 mounted therein, while the film winding spool 23 is located within the chamber 22. The film delivering spool 32 is mounted in a U-shaped bracket 5 fixed to the lid 3 near the hinge 2. To the arms 6 and 7 of the said bracket spool pins 8 and 9 and star-shaped springs 10 and 11 are fixed. Within the chamber 12 the side walls of the casing 1 have cam plates 13 and 14 fixed thereto which are adapted to engage the arms 6 and 7 and to lock the same in position when the lid 3 is closed. Thus the springs 10 and 11 are in yielding engagement with the flanges of the spool 32 and they exert a uniform braking action thereon. Thus I am enabled to exert regulated braking action on the spools.

The film taken from the spool 32 is guided on rollers 15 and 16 which are rotatably mounted on leaf springs 17 and 18 secured to brackets 19 and 20 fixed to the side walls of the camera casing 1, the springs 17 and 18 having the tendency to force the rollers 15 and 16 outwardly.

The lid 3 is provided with an inwardly projecting film backing portion 21 which as shown is in the form of a plate fixed to the lid, and which is adapted to force the guide rollers 15, 16 inwardly. The said rollers are mounted on the springs 17, 18 so that the springs are slightly spaced from the plate 21 when the camera is closed so that they do not slide on and scratch the film.

It will particularly be remarked that the lid is hinged on an axis parallel with the axes of the film-delivering and film-winding spools; and that, in consequence, the lid swings in the direction of film advance. It will further be remarked of the rollers 15, 16 borne by the leaf springs 17, 18, that, engaging the film as the lid closes at points spaced apart in the direction of film advance, the two rollers of each pair spread somewhat as the sustaining spring is compressed; and that, in so doing, these rollers exert longitudinal tension upon the film as they bring it to position against plate 21.

The film winding spool is mounted within the chamber 22 in any known or preferred manner, and it is adapted to be rotated for winding the film by means of a key. To set the film backing plate 21 in the exact position within the camera corresponding to the focal length of the object lens lugs 24, 25, 26 and 27 are provided on the side walls of the camera casing 1, the said lugs being engaged by the plate 21 when the lid 3 is closed.

The camera is used as follows:

For placing the spools into the casing the lid 3 is opened, and an empty spool is placed into the chamber 22. The film carrying spool is placed between the upwardly directed flanges 6 and 7 of the bracket 5 and on the pins 8, 9, the arms 6 and 7 yielding outwardly and permitting the spool to be readily inserted between the springs 10 and 11. The film wrapper is drawn from the spool, passed on the guide rollers 15, 16 and attached to the empty spool. While the lid 3 is being closed, the key is turned so as to compensate for the slackening of the film caused by the inward movement of the spool 32.

When the lid 3 is closed the guide rollers 15, 16 are pressed inwardly by the plate 21, and the said plate bears on the lugs 25, 26, and 27. The flanges 6 and 7 are engaged by the cam plates 13 and 14, so that the springs 10 and 11 exert braking action on the film carrying spool. This braking action is uniform and exactly regulated, so that the rollers 15 and 16 are not pressed inwardly and away from the plate 21, and the tension of the film being wound holds the said film in contact with the plate 21. Thus the film is held in plane position.

Should a very pronounced curved film portion pass on one of the rollers 15 or 16, the said roller is slightly pressed inwardly and away from the plate 21 while the main portion of the film remains plane. Thus only a very small part of the film gets out of the focal plane.

I claim:

1. In a photographic camera that comprises a casing open at the rear, a lid hinged to the casing and adapted to close the casing in the rear, and means for rotatably supporting within the camera on axes parallel to the axis of the hinged union of the lid to the casing a film-delivering and a film-winding spool with a reach of unwound film extending between the two spools, the said lid being provided with a plane surface adapted to afford backing from the rear for the reach of unwound film extending in position for exposure between said spools, the lid swinging in the direction of film advance, the combination of leaf spring means mounted at an intermediate point in its extent upon the casing and having arms extending from its mounting forwardly and rearwardly in the direction of film advance and adapted to engage the film on both sides of the opening, the said spring means being equipped at the ends with film-guiding rollers adapted to engage from the front the reach of unwound film extended between said spools and as the lid is closed adapted to hold the film upon the plane surface of the closed lid.

2. In a roll-film camera that includes rotation-permissive mounting for film-delivering and film-winding spools with a reach of unwound film drawn by the film-winding spool from the film-delivering spool and extending between them and a stationary backing for supporting from the rear the reach of unwound film, the improvement herein described of means for maintaining the unwound reach of film in an accurately determined plane, such means including resilient means borne by the casing and adapted to engage the reach of unwound film and to hold it to such backing, and braking means yieldingly engaging peripherally the flanges of the film-delivering spool.

3. In a roll-film camera that includes mounting for film-delivering and film-winding spools, with a reach of unwound film extending between them, and a stationary backing for supporting from the rear the reach of unwound film, the invention herein described that consists of a pair of leaf springs borne by the camera and extending longitudinally of and adjacent to the edges of such reach of unwound film, and a pair of rollers borne by and between the arms of the said leaf springs, the rollers adapted to engage from the front such reach of unwound film and to hold it resiliently to the stationary backing.

WILHELM BAUMGÄRTNER.